Nov. 9, 1965    J. CUNETTA    3,216,570
CIRCULAR CLARIFIERS WITH ROTATION-CONTROLLED SETTLING
Filed Dec. 8, 1960    4 Sheets-Sheet 2

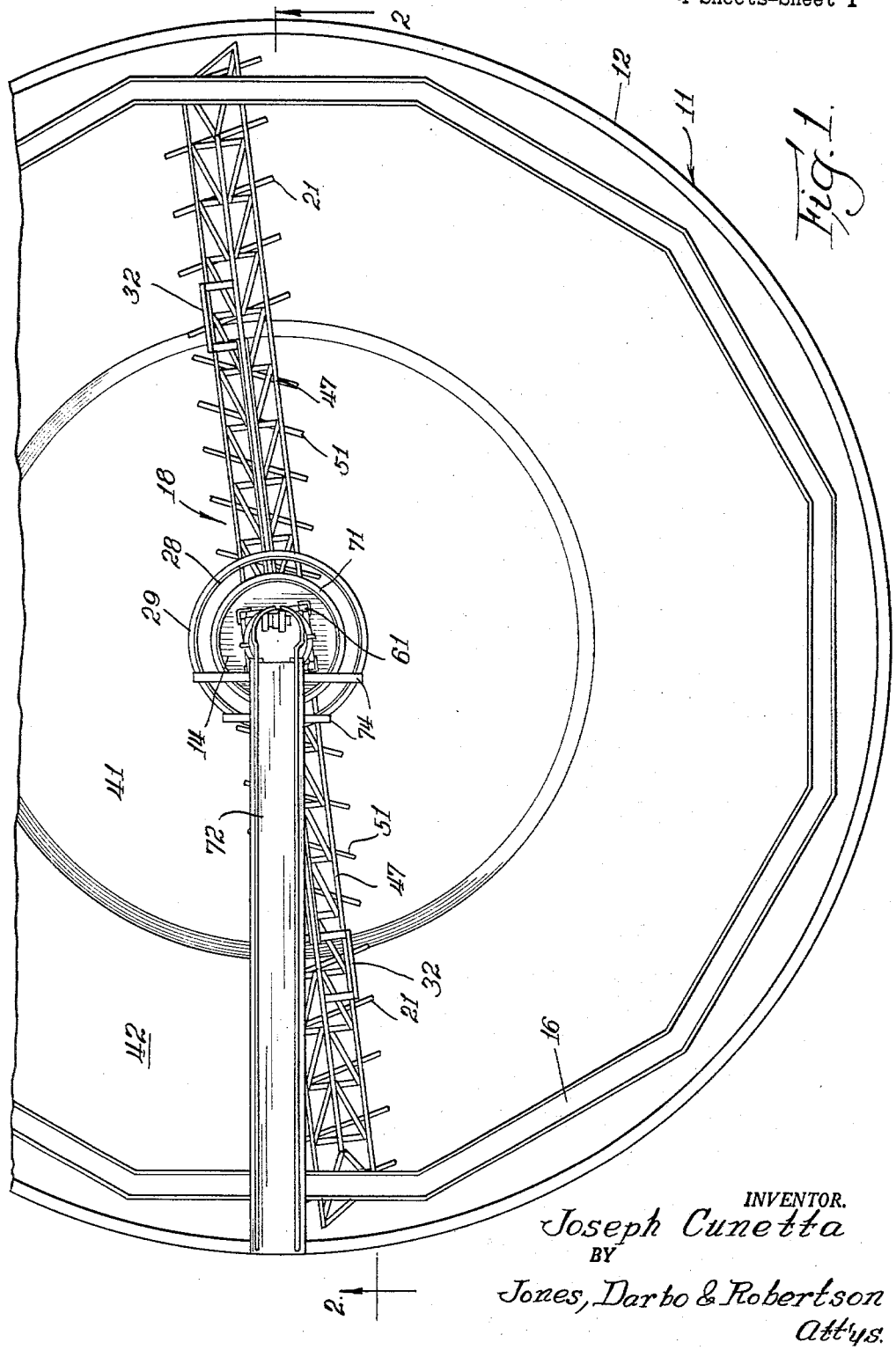

INVENTOR.
Joseph Cunetta
BY
Jones, Darbo & Robertson
Attys.

INVENTOR.
Joseph Cunetta
BY
Jones, Darbo & Robertson
Attys.

Nov. 9, 1965    J. CUNETTA    3,216,570
CIRCULAR CLARIFIERS WITH ROTATION-CONTROLLED SETTLING
Filed Dec. 8, 1960    4 Sheets-Sheet 4
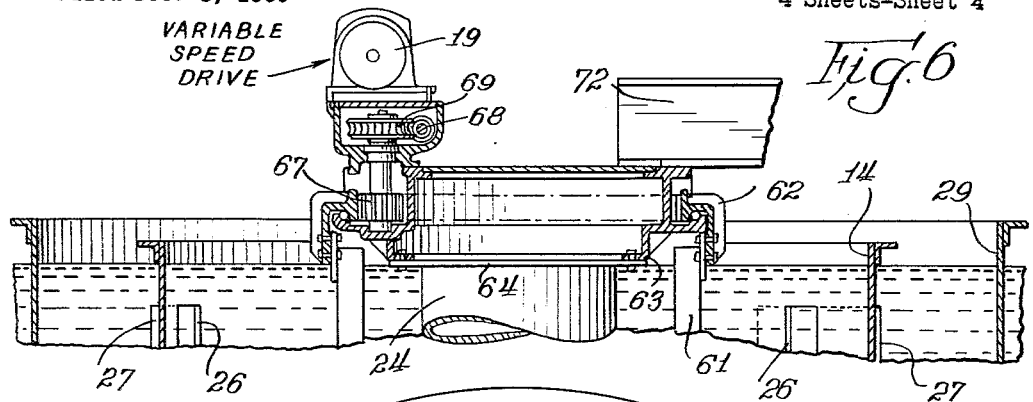
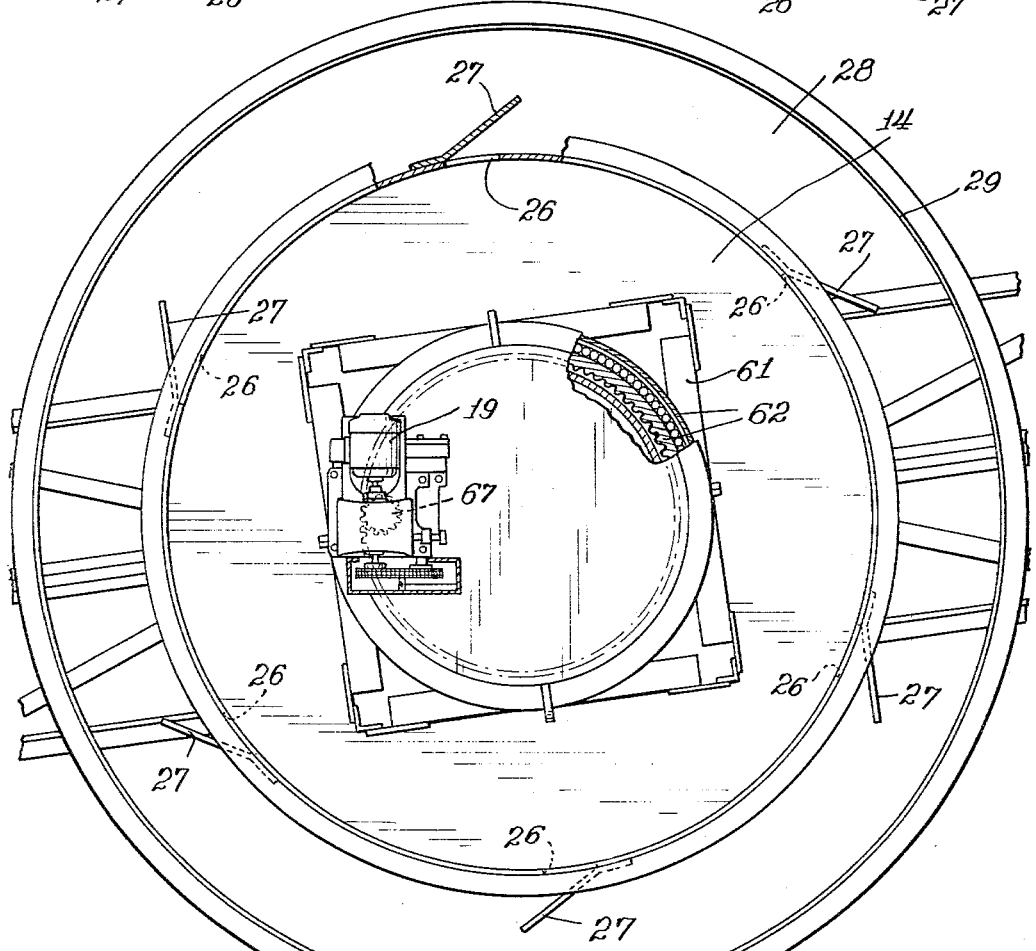
INVENTOR.
Joseph Cunetta
BY
Jones, Darbo & Robertson
Att'ys.

United States Patent Office 3,216,570
Patented Nov. 9, 1965

3,216,570
CIRCULAR CLARIFIERS WITH ROTATION-
CONTROLLED SETTLING
Joseph Cunetta, 130 Fenimore St., Brooklyn, N.Y.
Filed Dec. 8, 1960, Ser. No. 74,513
4 Claims. (Cl. 210—83)

The improved circular clarifiers of the present invention are especially advantageous when used as the final settling tanks of activated sludge sewage treatment plants. In such plants there are three criteria for the satisfactory operation of the final settling tanks; a clear effluent, a dense sludge, and a fresh sludge. Obviously the effluent should be clear for discharge into a stream. The denseness of the sludge is to some degree a measure of the effectiveness of the settling tank and also contributes to efficiency in the tanks to which it flows. When less water is included such tanks can be smaller. The freshness of the sludge is important when it is to be returned to the aeration tanks for seeding the incoming sewage. As the treated sewage flows from the aeration tank into the final settling tank the sludge within this treated sewage is in prime biological condition. The longer it remains in the final settling tank, however, where there is no oxygen supply, the more it deteriorates, by becoming stale or developing an oxygen deficiency. Accordingly it is desirable to have a short sludge detention time within the final settling tank. In other words, the sludge should be settled and drawn off quickly, once it enters the clarifier.

Heretofore rectangular final settling tanks have usually given better performance than circular final settling tanks. However, the circular settling tanks are advantageous in having lower equipment installation and maintenance costs. According to the present invention the performance of circular clarifiers or settling tanks is substantially improved. The sludge detention time is reduced so that the sludge is removed while it is still quite fresh. Nevertheless its accumulation is mainly concentrated in a relatively small portion of the tank so that it can be allowed to accumulate to a sufficient depth to ensure a reasonably high density, and that there is plenty of opportunity for the water leaving it to drop out its residual solids and thus become quite clear before passing into the effluent troughs.

This improved performance is obtained according to the present invention largely by producing a rotation of the contents of the tank at a speed which is just sufficient to keep the denser sludge or the sludge blanket concentrated approximately in the part of the tank within the central half of the tank diameter.

In circular clarifiers the incoming sludge has usually been discharged into the clarifier at a central location. Its action after discharge has been likened to a waterfall. Being denser than the surrounding water which has already become partially clarified, the incoming stream tends to fall rapidly to the bottom and spread outwardly in currents called "density currents." The density currents are to a large extent the cause of poor performance in circular clarifiers. They tend to be erratic in their flow. Once they start flowing along a given route they tend to sweep out and out until something turns them. Usually this has been the side wall of the tank. However, this causes the incoming sludge to move fairly quickly by means of these density currents to the vicinity of the effluent troughs. This naturally results in a cloudy effluent. This action of the density currents has also caused large quantities of the sludge to settle in the outer or peripheral portion of the settling tank. Most commonly the sludge drawoff has been from the center of the tank, and this has meant that much of the sludge has had to be moved from the peripheral portion to the central drawoff portion by a relatively slow movement along the floor of the tank, aided by slow-moving blades which scrape or shove the settled sludge along the floor of the tank. Although there has been a proposal to provide a sludge collecting trough along a circle approximately halfway from the center of the tank to its periphery, this has not been a complete solution. It did save about half the time of movement of the settled sludge along the floor, but this still failed to provide sludge drawoff as fresh as is desired. Some improved freshness has also been obtained by withdrawing the settled sludge through a series of collecting suction nozzles carried along circular paths more or less throughout the area of the tank bottom. This has sometimes resulted in a sludge of low density because of gathering the sludge from such a large area that if the sludge was to be removed while still fresh it did not have time to accumulate to a depth which would produce density.

According to the present invention, the density currents are controlled by causing a rotation of the entire mass of liquid in the settling tank, at a carefully chosen speed. This keeps the sludge blanket well separated from the effluent troughs, and it also results in settling the great majority of the sludge on a central portion of the tank which may be roughly only approximately one-fourth of the area of the tank floor. This in turn permits withdrawing the sludge while it is still fresh since it has but a relatively short distance to be moved to either a withdrawing trough or suction nozzles. Because the sludge is nearly all settled on such a small area of floor, relatively speaking, it can be allowed to be built up to a sufficient depth to provide fairly high density of sludge and yet can be removed with a quite short detention period. As a result, it is both fresh and dense.

The resulting improved performance of the clarifier permits a clarifier of a given volumetric size to handle larger volumes of sewage sludge successfully. There results substantial economy in initial tank costs, as a tank of a smaller size is able to handle and settle sludge from a given volume of incoming sewage. A smaller settling tank in turn reduces the costs of operation and of the equipment used in the tank. In addition, the improved freshness of the sludge provides economy in the operation of the aeration tanks inasmuch as less aeration is required when the seed sludge is fresh, its aerobic bacteria being already supplied with oxygen and ready to go to work.

Additional objects and advantages of the invention will be apparent from the following description and from the drawings.

Designation of FIGURES

FIGURE 1 is a fragmentary plan view of a clarifier chosen for illustration of the invention.

FIGURE 2 is a vertical sectional view through the clarifier of FIG. 1, taken approximately along the line 2—2 of FIG. 1.

FIGURE 2A is a flow diagram of an activated sludge plant in which the clarifier of this invention is used and is especially advantageous.

FIGURE 3 is a detailed sectional view taken approximately on the line 3—3 of FIG. 2 to show a cross section of a drawoff pipe and nozzle.

FIGURE 4 is a side view of the structure shown in FIGURE 3.

FIGURE 6 is a fragmentary vertical sectional view showing especially the drive mechanism.

FIGURE 7 is a plan view of the central portion of the apparatus, with some parts omitted for clarity.

Background description

Figure 5:
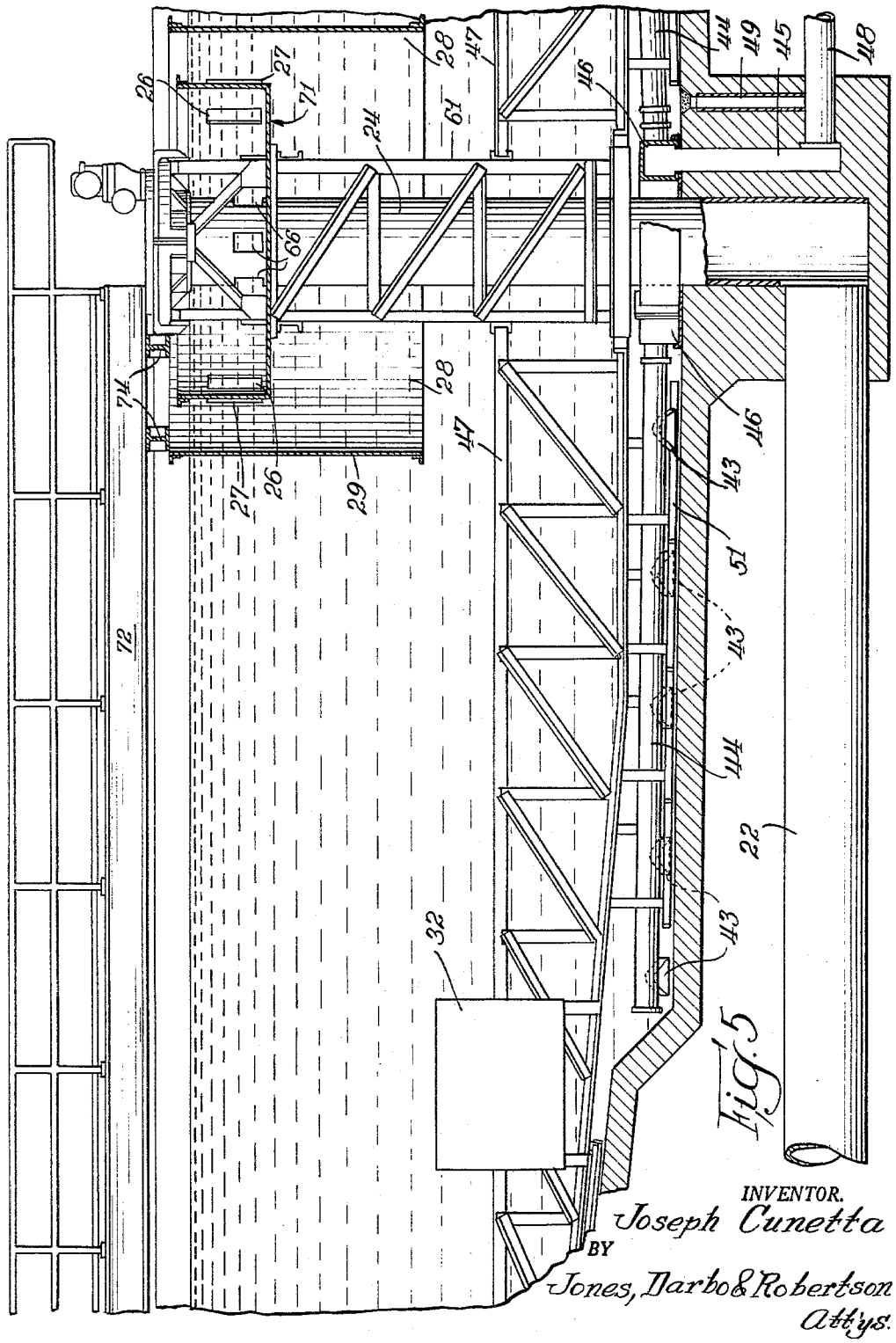
FIGURE 5 is a fragmentary vertical sectional view on a considerably enlarged scale as compared to FIG. 2.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The clarifier can perhaps best be understood by reference to FIG. 2. Here it is seen that the clarifier is essentially a large tank 11 having side walls 12 and bottom 13. A typical use for such a tank is shown in flow diagram of FIG. 2A. The treated or partially treated sewage from the activated sludge aeration tanks is preferably discharged into the settling tank 11, from which settled sludge is pumped, partly back for seeding the aeration tank (perhaps after secondary aeration) and partly to the digester. The sewage from the aeration tank enters the clarifier through a central influent chamber 14. The clarified liquor from which the solids have settled is allowed to overflow into an effluent trough 16. As best seen in FIG. 1 the effluent trough 16 extends generally all along the periphery of the tank although preferably spaced slightly from the extreme periphery. Several effluent pipes 16′, of which one is shown, may carry the effluent from the trough 16.

A rotary collector mechanism generally represented by 18 is driven by a motor and gear combination 19. Conventionally such collector mechanism includes a plurality of inclined blades 21 which ensure movement of the settled sludge toward the sludge collecting trough which heretofore has been most commonly close to the center of the tank.

In the illustrated form of clarifier the sludge from the aeration tank is supplied through an inflow pipe 22 to a vertical passage 23 and an upstanding fixed pipe 24. Alternatively the inflow can be through a pipe extending through the side of the tank and to the inflow chamber 14 or other inflow chamber centrally located in the tank

Rotating influence

As best seen in FIG. 7, the influent chamber 14 is provided with a series of evenly spaced restricted ports 26 on the outside of each of which is an inclined vane 27. The total cross-sectional area of the ports 26 is small enough to cause the liquid level within the influent chamber 14 to be slightly higher than that outside, perhaps three inches, so that there is a strong current flowing through each of the ports 26 and directed by the adjacent vane 27 in a generally tangential direction. This causes a rotating movement of the body of liquid within the outer or distribution chamber 28. The distribution chamber 28 is separated from the main body of tank 11 by a cylindrical wall or skirt 29. Beneath this skirt 29 there is open communication between the distribution chamber 28 and the main body of the tank 11. The rotating movement throughout distribution chamber 28 is sufficient to prevent short circuiting currents through it. As a result, there is quite uniform flow of the incoming liquid under all points of the skirt 29. This uniformity is itself quite helpful, but in addition, its rotary movement tends to prevent the dense liquor forming the influent from acting simply as a waterfall and dropping directly to the bottom. Its rotational movement tends to start it in an outward direction. Again the rotational movement is helpful in tending to make this outward movement uniform throughout the periphery of the skirt 29.

The rotary action within the distribution chamber 28 and its flow out from under the skirt 29 is the subject of a patent to James Donald Walker issued Apr. 21, 1953, U.S. Patent No. 2,635,757. Its use may not be essential to the other features of the invention but it enhances their advantages.

Rotation of main body

An important feature of the present invention is in rotating the main body 31 of liquor in the tank 11. This is accomplished by rotation of rotary collector mechanism 18. It is apparent that its truss-like structure as seen in FIG. 2 has a substantial rotation-inducing area so that increasing the rotational speed of the collector above its usual speed heretofore may cause the body 31 to rotate. It has been found however that improved results are obtained by providing large panels 32 carried by the rotating structure at points well out from the center of the tank. Because these panels tend to create some turbulence they should also be located well spaced from the effluent trough 16, and at least slightly spaced from the location of sludge collection.

The rotary collector mechanism 18 with its panels 32 should be driven at such a speed that the main body of liquor 31, or at least the lower areas thereof in which the sludge blanket is found, rotate at a sufficient speed to "turn" the density currents or prevent them from reaching the vicinity directly below the effluent troughs 16. Preferably the density currents are confined approximately to the inner half diameter of the tank 11. The speed of rotation of the rotating structure 18 which is necessary to accomplish this result is difficult to predict, at least on the basis of present information. Accordingly, it is preferred that the drive 19 be a variable speed drive with infinitesimal increments of speed variation such as is accomplished by the provision of variable pitch V-belt drives. Probably such variable speed drive will always be desirable because of the variations in density of influent to the final settling tank, volume of the influent and other variables. It is desirable not to rotate the rotating mechanism faster than is necessary for accomplishing the above stated results, because that would waste power and might cause some deterioration in the quality of the effluent. Present information indicates that the proper speed of rotation of the body 31 is in the range of 17 feet per minute peripheral speed in an 80′ diameter tank. Accordingly, the variable speed drive should have a range of speed which will yield a peripheral speed of the rotary collector extending well on both sides of 17 feet per minute. With a 3 to 1 available speed variation, a range of 9 to 27 feet per minute is suggested.

It is quite easy to adjust the speed of rotation to a desirable speed according to this invention without knowing in advance what specific speed is desired. One way of accomplishing this is to use submerged vanes suspended from a small float. For example, two aluminum vanes about three inches by six inches may be fastened together in the form of a cross and suspended by a thin aluminum rod, aligned with their intersection, from a cork float of six inches by six inches by one inch. Such a float rides quite high in the water and the movement of the assembly will therefore be almost entirely determined by the movement of water surrounding the vanes. The rod may be of adjustable length chosen to hold the vanes at the depth for which the determination of speed or direction of movement is desired. Assuming a tank having a side wall depth below the water level of ten feet, a submergence of about nine feet to the center of the vanes is one appropriate depth for determining the proper speed at which the rotary collector mechanism should be driven according to the present invention.

With the aeration tank operating normally and the normal flow therefore entering the settling tank or clarifier, the suspended vane device is placed at the desired outer limit of the area of heavy settling. This might, for example, be 0.6 of the radius from the axis of the tank. If the suspended vane device moves outwardly, a higher speed of rotation of the collector mechanism should be tried. If the vane device moves inwardly, a lower speed of the rotary collector mechanism should be tried. If the vane device moves circumferentially, the speed of the collector device is presumably correct.

Another method of finding the right speed is by the use of a sampling bottle. Such a bottle at the end of a rod, with means extending along the rod for opening and closing the bottle, can be lowered to the floor at various points and the nature of the sludge at each point determined. The correct speed is the slowest speed at which the dense sludge is confined within the desired area, samples two feet further out being quite thin by contrast. Thus it will be apparent that no substantial settling is occurring at the outer position. Unless the sludge at the central area is satisfactorily thick, gradually increased speeds should be tried, but of course ordinarily none should be maintained if it is found to cause deterioration in the quality of the effluent entering the effluent trough 16 or passing over other effluent weir.

*Sludge collection facilities*

Although my original concept for the invention contemplated an annular sludge collection trough along a circle of a radius something like half the radius of the tank, the form illustrated in FIG. 2 is now preferred. Engineers of Walker Process Equipment, Inc. to whom I had communicated this invention, have informed me of tests indicating that there is a heavy settling of sludge approximately from that circle inwardly nearly to the vertical inflow pipe 22. They have therefore recommended that rotary suction collectors be used extending throughout this area.

Accordingly, the bottom 13 includes two portions, as seen in FIG. 2, a depressed and substantially flat central portion 41 and an outer portion 42 which gently slopes inwardly toward the portion 41. The flat portion 41 is swept by a series of suction nozzles 43 carried by two oppositely extending rotary drawoff pipes 44. FIG. 5 shows one pipe 44 on a larger scale, and FIGS. 3 and 4 show the collector nozzle in detail.

As seen best in FIG. 5 the two rotary drawoff pipes 44 are connected to a rotary manifold 46 which is open along its bottom so that at all times it communicates with a drawoff passage 45 leading to main sludge drawoff pipe 48. It may be mentioned at this time that vertical passage 49 is merely a normally plugged drain passage for aiding in emptying the tank when desired.

The rotary sludge drawoff pipes 44 are slung beneath the truss arms 47 of the rotary collector mechanism. These arms also sweep the outer floor portions 42 with inclined blades 21 commonly called "collector flights." These flights shove the small amounts of sludge settling on outer portion 42 of the floor inwardly to the gathering area 41.

As seen best in FIG. 5 there are also collector flights 51 sweeping the flat portion 41 of the floor. As seen in FIG. 1, the flights 51 slope in the opposite direction from the slope of flights 21. Thus while clockwise movement of the rotary collector mechanism (as viewed from the top) will push the sludge inwardly along floor portion 42, it will push the sludge outwardly along floor portion 41. There is a natural tendency for the sludge on the inner or more central portions of central floor portion 41 to move outwardly, and therefore the direction of the flights cooperates with its natural tendency.

The construction described results in very quick removal of nearly all of the settled sludge once it reaches the floor level. Although a substantial length of time is required for the sludge settling near the periphery of the tank to move to the depressed portion 41, very little sludge settles in that peripheral region. The flights 21 nevertheless move it along reasonably rapidly so that it will not become extremely stale. On the inner portion of the outer sloping floor portion 42, there may be considerably heavier settling of sludge. However, this is so close to the depressed portion of 41 that this sludge has very short detention time, due to its quick movement from its point of settling to the path of the outer suction nozzle 43.

It may be mentioned that although the flights 21 and 51 appear to be separated from one another this is so only when just one of the arms 47 is considered. The flights on the other arm 47 are relatively staggered so that they sweep the tank area which would be left unswept by the flights on the first arm.

*Size of stirring panels*

The size of stirring panels 32 required will depend on various circumstances. The panels should be large enough so that the rotary collector mechanism 18 will not rotate so much faster than the main body of liquid 31 as to cause that degree of turbulence which will interfere with the quality of the effluent. Since there is some turbulence around the edges of the panels 32 themselves, and since they may desirably project above the arms 47, the panels 32 should not be far enough out to be in the vicinity of the space under the effluent troughs 16. Except for that limitation, they may be shifted as requirements seem to dictate. However, the preferred position is that shown where they ensure maximum stirring effect in the vicinity where it is desired to turn back the density currents. A panel twenty-six inches high by eight feet along was found satisfactory in a tank of eighty feet diameter and ten feet side wall depth, even with rod type of arms that did not have nearly the stirring effect of the illustrated truss arms 47. About half that size is probably adequate with the truss arms shown, since they have a substantial stirring effectiveness.

*Further details*

Although the means for rotating the rotary collector 18 may be conventional except for the use of a variable speed drive, it may be helpful to describe it briefly. The arms 47 are carried by a vertical framework or drive cage 61. As seen best in FIG. 6, this framework is carried by a ring 62 which is rotatably carried by a stationary ring or head 63, preferably with ball bearings between the two. The ring 63 is carried by the upstanding inflow pipe or pier 24, being bolted to a flange 64 thereon. As seen in FIG. 5, the pipe 22 has ports 66 for the flow of the influent.

In the illustrated form of the invention, as seen best in FIG. 6, the ring 62 is an internally toothed gear engaged by a pinion 67 which may be turned by a worm 68 and worm wheel 69, the worm 68 being driven by the variable speed drive 19.

The influent chamber 14 may be formed by a rotatably carried tub 71 which is sealed or approximately sealed to the influent pipe 24 below the ports 66 so that all of the flow will have to pass through restricted ports 26.

The cylinder 29 forming the outer distribution chamber 28 could also be rotatably carried but is more conveniently carried by the bridge structure 72 which extends between the outer wall of the tank and the central pipe 24 on which the inner end of the bridge rests. Thus, in FIG. 5, crossbeams 74 have been shown for supporting cylinder 29 from the main beams of bridge 72. In fact, there may also be some outrigger beams supported by these beams 74 for supporting the far side of cylinder 29 but these have been omitted for the sake of clarity of the more important features. In fact, even the beams 74 have been omitted from other figures.

A half hour detention of the sludge blanket in the tank may produce the optimum sludge removal results. The portion of the radius of the tank floor which should be used for substantial settling to give this half hour detention of sludge depends on the size of tank in hours of detention of the tank liquor.

| Hours of liquor detention: | Ratio of radius used for settling to entire radius |
|---|---|
| 1 hour | 0.71 |
| 1½ hours | 0.58 |
| 2 hours | 0.50 |
| 3 hours | 0.41 |
| 4 hours | 0.35 |

*Summary*

From the foregoing it is seen that there is provided a circular clarifier in which a substantial speed of rotation of the body of clarifying liquid concentrates the settling of sludge in a central area small enough so that quick withdrawal of the settled sludge, while it is still in fresh condition, is possible even though the sludge is allowed to accumulate to a sufficient depth to ensure density of the withdrawn sludge. Furthermore, this same rotary motion keeps the density currents well away from the general vicinity of the effluent troughs, so that the effluent is dependably clear. With no density currents invading the area of ultimate clarification, this area can be used at its maximum propensity thereby increasing the overall capacity of a clarifier of a given size. This in turn decreases construction costs, operating costs and maintenance costs. When the clarifier is used as the final settling tank in an activated sludge type of waste treatment, there is further economy in the operation thereof in that the sludge is returned in prime biological condition so as to get the treatment of the raw incoming sewage with which it is mixed off to the quickest possible start. Likewise the density of the sludge causes it to take up less room in the tanks to which it flows, digestor in the case of the waste sludge and the secondary aeration or aeration tank in the case of the return sludge. The term activated sludge treatment is used herein in its broader sense including both the form in which only one aeration tank is used and that in which a smaller initial aeration tank is used, the denser return sludge being further aerated and biologically treated in aeration or secondary aeration tanks.

The rotation induced in the upper levels is also beneficial in turning any wind-blown or surface currents which might cause unclarified liquor to reach the trough 16. Of course, a surface guard plate may also be used a little inwardly from the trough 16 if desired, or on both sides of the trough. Likewise it should be understood that any features improving the trough or other weir may be used, such as a serrated weir edge.

The invention claimed is as follows:

1. A method of clarifying a liquid having settleable solids therein of the nature of activated sludge including maintaining in a generally quiescent state for settling a substantial body of the liquid in a tank having a floor and an effluent trough along the tank periphery, continuously releasing liquid to be clarified into the tank centrally thereof, thereby displacing surface water into the effluent trough, rotating substantially the entire lower portions of the body at a speed selected to cause the settling solids to settle predominately, and to a greater extent than would be the case without such rotation, on a central area of the floor spaced substantially inwardly from beneath the effluent trough, and removing the solids settled on said area from the tank continuously and promptly.

2. A method of clarifying a liquid having settleable solids therein of the nature of activated sludge including maintaining a generally quiescent state for settling a substantial body of the liquid in a tank having a floor and an effluent trough along the tank periphery, continuously releasing liquid to be clarified into the tank centrally thereof, thereby displacing surface water into the effluent trough, rotating substantially the entire lower portions of the body at a speed selected to cause the settling solids to settle predominantly, and to a greater extent than would be the case without such rotation, on a central area of the floor spaced substantially inwardly from beneath the effluent trough, and removing the solids settled on said area from the tank.

3. The method of operating a circular clarifier having a peripheral wall, a central inlet, an effluent trough near and substantially all along its peripheral wall, and a rotary structure close to its floor and of substantial stirring ability, which comprises supplying to the inlet a mixture of liquids and settleable solids of the nature of activated sludge while maintaining quiescent conditions in the region of the effluent trough and thereby causing displacement of surface liquid into the effluent trough, and rotating the rotary structure at a speed selected to cause rotation of substantially the entire lower portions of the contents of the clarifier at a speed to cause the solids to settle predominantly, and more concentratedly than would be the case without such rotation, on a central area of the floor of the tank.

4. The method of operating a sewage treatment plant including an aeration tank and having inflow and outflow portions and a circular clarifier having a peripheral wall, a central inlet, and effluent trough near and substantially all along its peripheral wall, and a rotary structure close to its floor and of substantial stirring ability, which comprises supplying to the inlet from said outlet flow portion a mixture of liquids and settleable solids of the nature of activated sludge while maintaining quiescent conditions in the region of the effluent trough and thereby causing displacement of surface liquid into the effluent trough, rotating the rotary structure at a speed selected to cause rotation of substantially the entire lower portions of the contents of the clarifier at a speed to cause the solids to settle predominantly and more concentratedly on a central area of the floor of the tank, drawing settled sludge from the tank and returning a portion thereof to the aeration tank in the vicinity of the inflow portion thereof.

References Cited by the Examiner

UNITED STATES PATENTS

| 1,434,596 | 11/22 | Door | 210—530 |
| 1,938,894 | 12/33 | Darby et al. | 210—528 X |
| 1,947,429 | 2/34 | Towsend et al. | 210—83 |
| 2,150,865 | 3/39 | Shafer, Jr. et al. | 210—528 |
| 2,236,434 | 3/41 | Knowles | 210—528 |
| 2,279,970 | 4/42 | Coe | 210—528 |
| 2,289,112 | 7/42 | Fischer | 210—530 X |
| 2,506,927 | 5/50 | Kelly | 210—530 X |
| 2,566,988 | 9/51 | Kolb | 210—531 |
| 2,635,757 | 4/53 | Walker | 210—84 |
| 2,647,869 | 8/53 | Kelly | 210—530 |
| 2,723,760 | 11/55 | Talbot | 210—530 |
| 2,805,843 | 10/57 | Block | 259—135 |
| 2,838,180 | 6/58 | Lawlor | 210—528 |
| 2,846,072 | 8/58 | Goetz | 210—84 X |
| 2,850,449 | 9/58 | Torpey | 210—83 |
| 2,854,146 | 9/58 | Nebolsine et al. | 210—83 |
| 2,899,071 | 8/59 | Bounin | 210—528 X |
| 2,966,268 | 12/60 | Lind et al. | 210—83 |

REUBEN FRIEDMAN, *Primary Examiner.*

HARRY B. THORNTON, HERBERT L. MARTIN,
*Examiners.*